United States Patent
Kang et al.

(10) Patent No.: US 8,045,122 B2
(45) Date of Patent: Oct. 25, 2011

(54) LIQUID CRYSTAL DISPLAY DEVICE

(75) Inventors: Jae-Su Kang, Gwangyang (KR); Dae-Kyu Kim, Gumi (KR)

(73) Assignee: LG Display Co., Ltd., Seoul (KR)

( * ) Notice: Subject to any disclaimer, the term of this patent is extended or adjusted under 35 U.S.C. 154(b) by 178 days.

(21) Appl. No.: 12/318,517

(22) Filed: Dec. 30, 2008

(65) Prior Publication Data

US 2009/0322979 A1    Dec. 31, 2009

(30) Foreign Application Priority Data

Jun. 25, 2008 (KR) .................. 10-2008-0060426

(51) Int. Cl.
*G02F 1/1345* (2006.01)

(52) U.S. Cl. ........ 349/152; 349/110; 349/111; 349/149; 349/150; 349/151

(58) Field of Classification Search .......... 349/110–111, 349/149–152
See application file for complete search history.

(56) References Cited

U.S. PATENT DOCUMENTS

| | | | | |
|---|---|---|---|---|
| 4,934,791 A | * | 6/1990 | Shimizu et al. | 349/107 |
| 5,400,157 A | * | 3/1995 | Won | 349/152 |
| 2006/0232740 A1 | * | 10/2006 | Shigemura et al. | 349/153 |
| 2008/0291376 A1 | * | 11/2008 | Chen | 349/106 |

FOREIGN PATENT DOCUMENTS

| | | |
|---|---|---|
| JP | 4-020929 | 1/1992 |
| JP | 9-43616 | 2/1997 |

* cited by examiner

*Primary Examiner* — David Nelms
*Assistant Examiner* — Phu Vu
(74) *Attorney, Agent, or Firm* — Morgan, Lewis & Bockius LLP

(57) ABSTRACT

A liquid crystal display includes: first and second substrates on which a display area and a non-display area are defined and a plurality of pixels are defined at the display area; a pixel electrode formed at each pixel on the first substrate; a plurality of first attachment improving protrusions formed at the non-display area along edges of the display area on the first substrate and made of the same material as the pixel electrode on the layer on which the pixel electrode is formed; a common electrode formed at least on a display area of the second substrate; a plurality of second attachment improving protrusions formed on the non-display area of the second substrate and branched off from the common electrode; and a sealant formed between the first and second substrates such that the sealant is attached with the first and second attachment improving protrusions, and having conductivity, wherein the common electrode receives a common voltage via the sealant and the first attachment improving protrusions.

5 Claims, 5 Drawing Sheets

LIQUID CRYSTAL DISPLAY DEVICE

BACKGROUND OF THE INVENTION

1. Field of the Invention

The present invention relates to a liquid crystal display (LCD) and, more particularly, to an LCD capable of improving an adhesive strength of a sealant by increasing an attachment area of the sealant formed between a first substrate, a thin film transistor (TFT) substrate, and a second substrate, a color filter substrate.

2. Description of the Related Art

In general, the application coverage of a liquid crystal display (LCD) extends thanks to its characteristics that it is lighter, thinner, and driven at a low power consumption. Thus, the LCD is commonly used as a means for displaying images in mobile computers, mobile phones, office automation equipment, or the like.

The LCD displays a desired image on its screen by controlling the amount of transmission of light according to a video signal applied to a plurality of control switching elements arranged in a matrix form.

The LCD includes a liquid crystal panel including a color filter substrate, an upper substrate, and a thin film transistor (TFT) substrate, a lower substrate, which face, between which and a liquid crystal layer is formed, and a driver that supplies a scan signal and image information to the liquid crystal panel to operate the liquid crystal panel.

The related art LCD having such construction will now be described with reference to the accompanying drawings.

FIG. 1 is a plan view illustrating the first substrate 1, the TFT array substrate, of the related art general LCD, and FIG. 2 is a sectional view taken along line I-I' in FIG. 1 and showing the section of a TFT 7 formed at each pixel on the first substrate 1.

As shown in FIGS. 1 and 2, the related art general LCD includes the first substrate 1, the TFT array substrate, and a second substrate 2, the color filter substrate, and a liquid crystal layer 6 formed between the first and second substrates 1 and 2.

With reference to FIG. 1, gate lines GL and data lines DL are formed to cross vertically and horizontally on the first substrate 1, defining a plurality of pixels, and TFTs 7 are formed at each crossing of the gate lines GL and the data lines DL of each pixel.

With reference to FIG. 2, the TFT 7 includes a gate electrode 7a formed on the first substrate 1, a gate insulating layer 7b formed on the gate electrode 7a, a semiconductor layer 7c formed on the gate insulating layer 7b, and a source electrode 7d and a drain electrode 7e formed on the semiconductor layer 7c. A passivation layer 8 is formed on the source electrode 7d and the drain electrode 7e.

The gate electrode 7a of the TFT 7 is connected with the gate line GL, the source electrode 7d is connected with the data line DL, and the drain electrode 7e is connected with the pixel electrode 9.

A color filter layer including color filters 11 corresponding to the pixels defined on the first substrate 1 is formed at a display area on the second substrate 2. Black matrixes 12 are formed at regions corresponding to the gate line GL, the data line DL and the TFT 7 of the display area AA and a region corresponding to a non-display area NA. A common electrode 4 is formed on the color filter 11 and the black matrix 12.

A common line 3 is formed at the non-display area NA on the first substrate 1 in order to supply a common voltage to the common electrode 4. The common line 3 is formed along edges of the display area AA, and may be connected with the common electrode 4 via a conducting means such as Ag dot or the like.

With reference to FIGS. 1 and 2, a sealant is formed along the edges of the display area AA) at the non-display area NA between the first and second substrates 1 and 2. The sealant 5 serves to allow the first and second substrates 1 and 2 to maintain their aligned and attached state and seal the region between the first and second substrates 1 and 2 to thereby prevent liquid crystal of the liquid crystal layer 6 from being leaked.

In the related art general LCD constructed as described above, the sealant 5 is formed to mostly overlap with the common line 3 on the first substrate 1 and the common electrode 4 on the second substrate 2 as shown in FIG. 1, and in this case, the common line 3 and the common electrode 4 are formed to be relatively smooth without any change in their level, so the sealant 5 attaching (bonding) the first and second substrates 1 and 2 cannot exert any force stronger than its intrinsic adhesive strength. Thus, if an external force (e.g., a force that pulls the first or second substrate) is applied to the first or second substrate 1 or 2, portions attached with the common line 3 or the common electrode 4 are frequently released at a certain region of the sealant 5, resulting in the leakage of the liquid crystal of the liquid crystal layer 6 to cause a defective image.

SUMMARY OF THE INVENTION

Therefore, in order to address the above matters, the various features described herein have been conceived. One aspect of the exemplary embodiments is to provide a liquid crystal display (LCD) capable of improving an adhesive strength of a sealant by increasing an attachment area of the sealant by forming a first attachment improving protrusion at a non-display area of a first substrate and a second attachment improving protrusion at a non-display area of a second substrate.

This specification provides an LCD including: first and second substrates on which a display area and a non-display area are defined and a plurality of pixels are defined at the display area; a pixel electrode formed at each pixel on the first substrate; a plurality of first attachment improving protrusions formed at the non-display area along edges of the display area on the first substrate and made of the same material as the pixel electrode on the layer on which the pixel electrode is formed; a common electrode formed at least on a display area of the second substrate; a plurality of second attachment improving protrusions formed on the non-display area of the second substrate and branched off from the common electrode; and a sealant formed between the first and second substrates such that the sealant is attached with the first and second attachment improving protrusions, and having conductivity, wherein the common electrode receives a common voltage via the sealant and the first attachment improving protrusions.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 3a and 3b show an LCD according to an exemplary embodiment of the present invention, wherein FIG. 3a is a plan view showing a first substrate and FIG. 3b is a plan view showing a second substrate;

FIGS. 5a to 6b show another example of the first and second attachment improving protrusions in FIGS. 3a and 3b, wherein FIGS. 5a and 6a are plan views showing the first substrate and FIGS. 5b and 6b are plan views showing the second substrate.

DETAILED DESCRIPTION OF THE INVENTION

A liquid crystal display (LCD) according to exemplary embodiments of the present invention will now be described with reference to the accompanying drawings.

Figure 1:
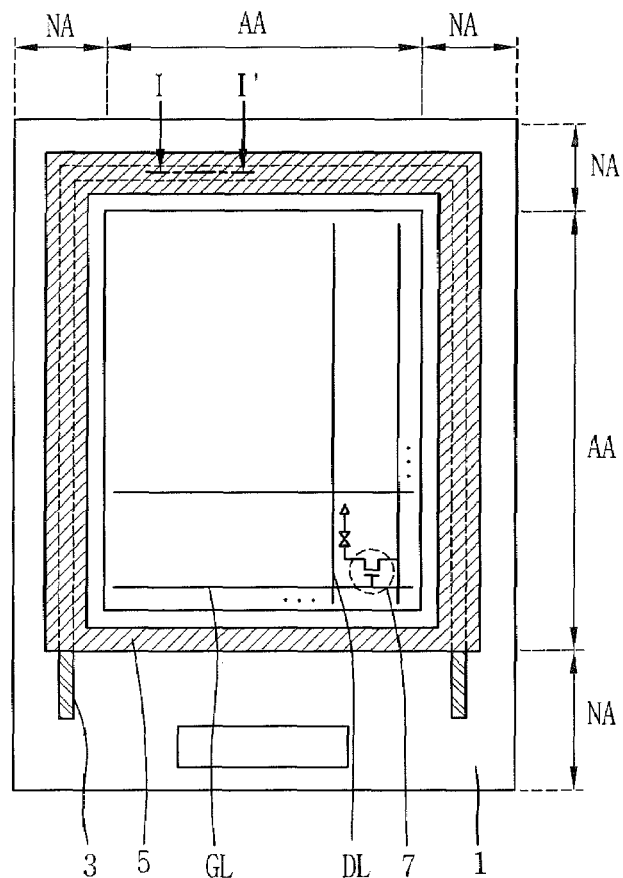
FIG. 1 is a plan view showing a general liquid crystal display (LCD)
Figure 2:
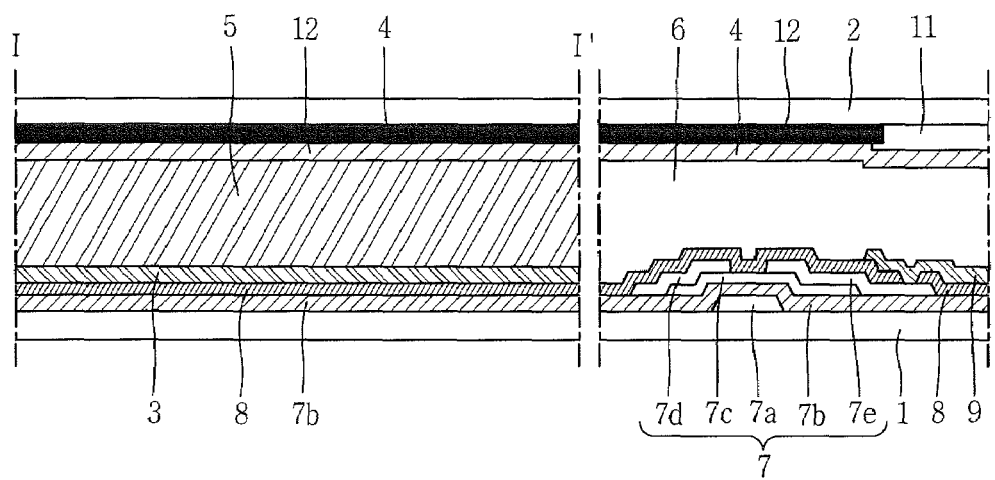
FIG. 2 is a sectional view taken along line I-I' in FIG. 1.
Figure 3A:
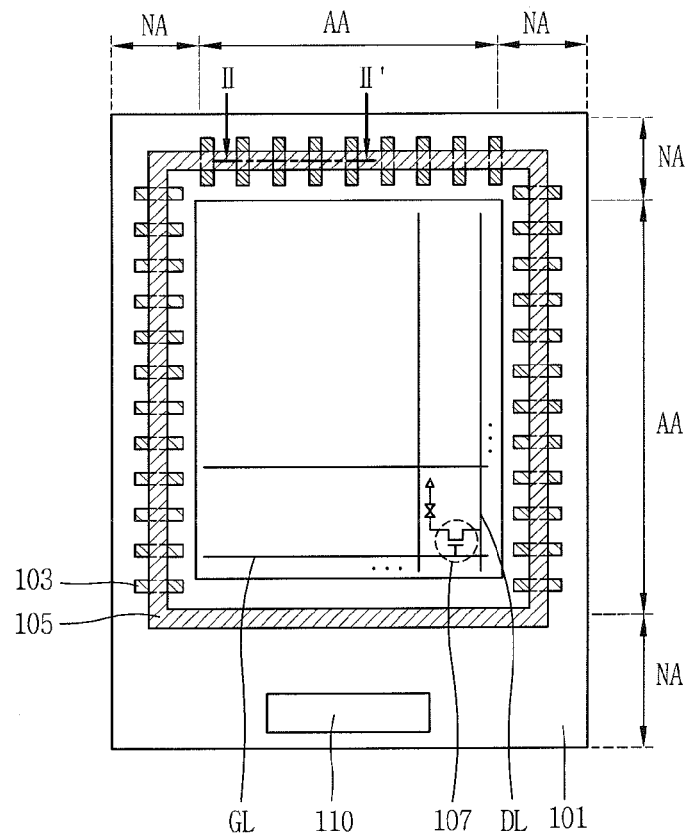
Figure 3B:
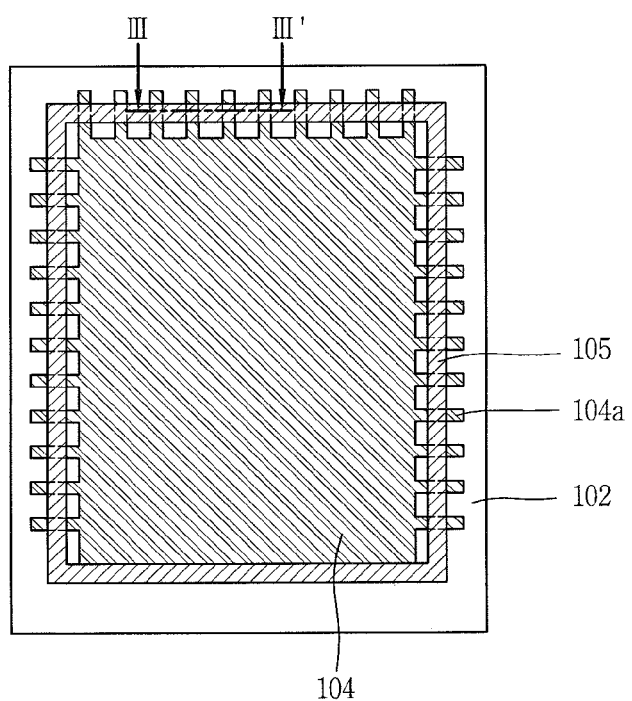

FIG. 3a is a plan view of a first substrate 101 of the LCD and FIG. 3b is a plan view of a second substrate 102 of the LCD according to an embodiment of the present invention. FIGS. 3a and 3b illustrate a sealant 105 for the sake of explanation. The left region in FIG. 4 illustrates the section taken along line II-II' in FIG. 3a and the section taken along line III-III' in FIG. 3b, and the right region in FIG. 4 illustrates the section of the region where a thin film transistor (TFT) 107 formed in a pixel defined on the first and second substrates 101 and 102 is formed.

Figure 4:
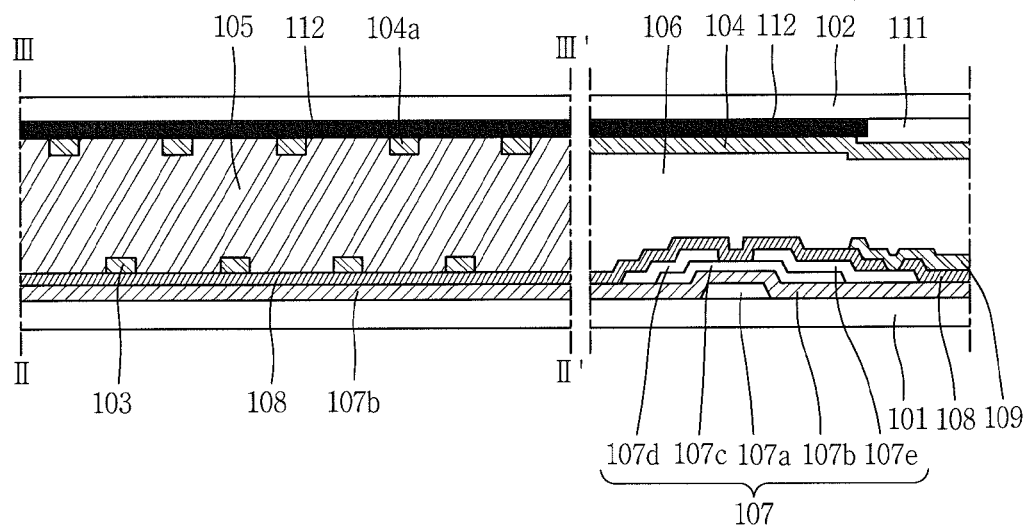
FIG. 4 is a sectional view taken along lines II-II' in FIG. 3a and lines III-III' in FIG. 3b, and showing the section taken along the region where a TFT in FIG. 3a is formed.

As shown in FIGS. 3a to 4, the LCD according to an embodiment of the present invention includes first and second substrates 101 and 102 on which a display area (AA) and a non-display area (NA) are defined and a plurality of pixels are defined at the display area (AA); a pixel electrode 109 formed at each pixel on the first substrate 101; a plurality of first attachment improving protrusions 103 formed at the non-display area (NA) along edges of the display area (AA) on the first substrate 101 and made of the same material as the pixel electrode 109 on the layer on which the pixel electrode 109 is formed; a common electrode 104 formed at least on a display area (AA) of the second substrate 102; a plurality of second attachment improving protrusions 104a formed on the non-display area (NA) of the second substrate 102 and branched off from the common electrode 104; and a sealant 105 formed between the first and second substrates 101 and 102 such that the sealant 105 is attached with the first and second attachment improving protrusions 103 and 104a, and having conductivity. The common electrode 104 receives a common voltage via the sealant 105 and the first attachment improving protrusions 103.

Each element of the LCD according to the embodiment of the present invention constructed as described above will now be described in detail.

With reference to FIGS. 3a and 4, the LCD according to the exemplary embodiment of the present invention includes a liquid crystal panel comprised of the first substrate 101, the TFT array substrate, and the second substrate 102, the color filter substrate, and a liquid crystal layer 106 formed between the first and second substrates 101 and 102. The first and second substrates 101 and 102 include the display area (AA) where a screen image is displayed and a non-display area (NA) constituting an external region of the display area AA, as defined thereon.

With reference to FIG. 3a, gate lines GL and data lines DL are formed to cross vertically and horizontally on the display area AA of the first substrate 101, defining a plurality of pixels, and TFTs 107 are formed at each crossing of the gate lines GL and the data lines DL of each pixel and connected with the gate line GL and the data line DL.

With reference to FIGS. 3a and 4, the TFT 107 formed at each pixel includes a gate electrode 107a formed on the first substrate 101, a gate insulating layer 107b formed on the gate electrode 107a, a semiconductor layer 107c formed on the gate insulating layer 107b, and a source electrode 107d and a drain electrode 107e formed on the semiconductor layer 107c. A passivation layer 108 is formed on the first substrate 101 with the TFT 107 formed thereon.

The gate electrode 107a of the TFT 107 is connected with the gate line GL, the source electrode 107d is connected with the data line DL, and the drain electrode 107e is connected with the pixel electrode 109.

A drive integrated circuit (IC) 110 is formed at the non-display area (NA) on the first substrate 101, connected with the gate line GL and the data line DL to supply a scan signal to the gate line GL and a data signal to the data line DL to thereby drive each pixel. Although not shown in detail, the gate line GL and the data line DL are formed to be connected with the drive IC 110.

With reference to FIGS. 3a and 4, a plurality of first attachment improving protrusions 103 are formed along the edges of the display area (AA) at the non-display area (NA) on the first substrate 101.

The plurality of first attachment improving protrusions 103 are formed in a straight line form side by side to cross the sealant 105. The plurality of first attachment improving protrusions 103 contact with the sealant 105 having conductivity so as to be electrically conducted to serve as a common line. Its relevant detailed description will be made with respect to the sealant 105 hereinbelow.

The first attachment improving protrusions 103 may be made of the same material as the pixel electrode 108 and formed on the layer on which the pixel electrode 108 formed at the display area (AA) is formed on the first substrate 101, and in this case, the gate insulating layer 107b and the passivation layer 108 are positioned below the first attachment improving protrusion 103.

FIG. 3 shows the example that the first attachment improving protrusion 103 is not formed at the region adjacent to the drive IC 110 in the sealant 105, namely, at the region where the gate line GL and the data line DL pass, but the present invention is not limited thereto and the first attachment improving protrusion 103 may be formed to overlap with the region where the gate line GL and the data line DL pass in the sealant 105 without departing from the spirit or scope of the present invention, and various other applications can be possibly made.

With reference to FIG. 4, the color filter layer including color filters 111 corresponding to the respective pixels defined at the display area (AA) of the first substrate 101 is formed on the second substrate 102. The black matrix 112 is formed to correspond to the gate line GL, the data line DL, the TFT 107 of the display region (AA) of the first substrate 101 and to correspond to the non-display area (NA). The common electrode 104 is formed on the color filter 111 and the black matrix 112 of the second substrate 102.

The black matrix 112 is made of a resin or metal, and the metal may include, for example, chromium or chromium oxide.

The common electrode 104 is formed to correspond to at least the display area (AA) of the first substrate 101, and forms a vertical field together with the pixel electrode 109 formed at each pixel of the first substrate to drive the liquid crystal layer.

A plurality of second attachment improving protrusions 104a branched off from the common electrode 104 are formed at a region corresponding to the non-display area (NA) of the first substrate 101 on the second substrate 102.

With reference to FIG. 4, the second attachment improving protrusions 104a are formed on the black matrixes 112, contacting with the black matrixes 112.

The second attachment improving protrusions 104a are formed to go crisscross with the first attachment improving protrusions 103 formed on the first substrate, without overlapping with them. Accordingly, the thickness of the sealant 105 formed between the first and second substrates 101 and 102 can be prevented from being reduced to below a certain limit due to the first and second attachment improving protrusions 103 and 104a.

With reference to FIGS. 3a and 4, the sealant 105 is formed at the non-display area (NA) between the first and second substrates 101 and 102 to attach the first and second substrates 101 and 102 and seal the liquid crystal layer 106 between the first and second substrates 101 and 102.

In the process of fabricating the LCD according to the exemplary embodiment of the present invention, when the first and second substrates 101 and 102 are attached after the sealant 105 is applied to the first substrate 101 with the first attachment improving protrusions 103 formed thereon or to the second substrate 102 with the second attachment improving protrusions formed thereon, the shape of the sealant 105 is changed to cover external faces of the first attachment improving protrusions 103 and the external faces of the second attachment improving protrusions 104a, and thereafter, the sealant 105 is hardened by using a hardening unit such as ultraviolet rays (UV) or a hot plate to have such a section as shown in FIG. 4.

The sealant 105 has the recess shape at the regions corresponding to the first attachment improving protrusions 103 and the second attachment improving protrusions 104a and is attached to the external faces of the first and second attachment improving protrusions 103 and 104a. Thus, the area of the sealant 105 attached to the elements of the first substrate 101 and the elements of the second substrate 102 is increased to increase the adhesive strength. If the black matrixes 112 are made of a metal, the adhesive strength of the sealant 105 would be further increased.

In addition, the sealant 105 is formed to have conductivity to electrically connect the plurality of first attachment improving protrusions 103 formed on the first substrate 101, to thus allow the first attachment improving protrusions 103 to serve as common lines, and to electrically connect the plurality of first attachment improving protrusions 103 formed on the first substrate 101 and the plurality of second attachment improving protrusions 104a formed on the second substrate 102 so that the common voltage from the first attachment improving protrusions 103 can be provided to the common electrode 104 via the second attachment improving protrusions 104a.

As mentioned above, the first and second attachment improving protrusions 103 and 104a increasing the adhesive strength by increasing the attachment area of the sealant 105 can be variably modified without departing from the spirit or scope of the present invention.

Namely, in the above description and FIGS. 3a and 3b, the case where the first and second attachment improving protrusions 103 and 104a are formed at 90o with respect to the boundary of the display area (AA) and the non-display area (NA) is taken as an example, but the present invention is not limited thereto and the shape of the first and second attachment improving protrusions 103 and 104a can be varied without departing from the spirit or scope of the present invention.

Figure 5A:
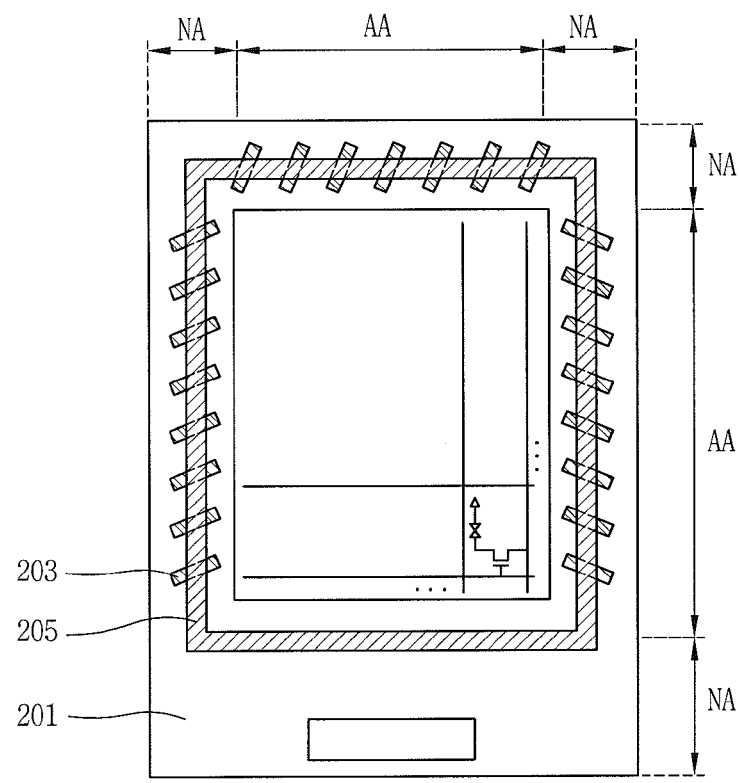
Figure 5B:
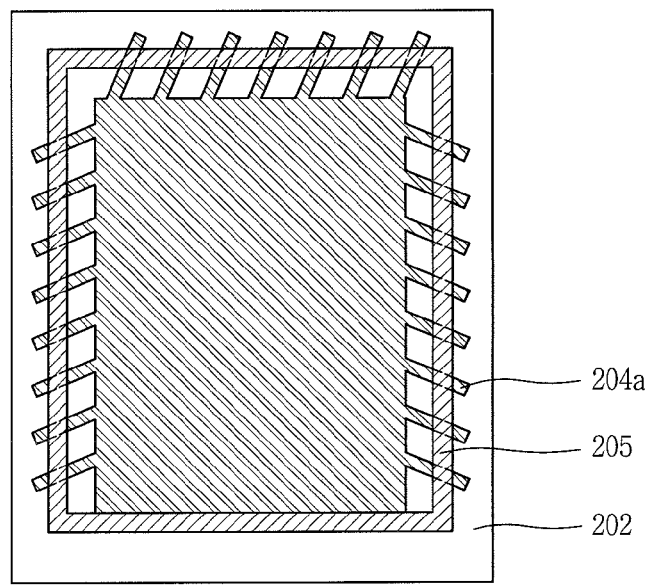
Figure 6A:
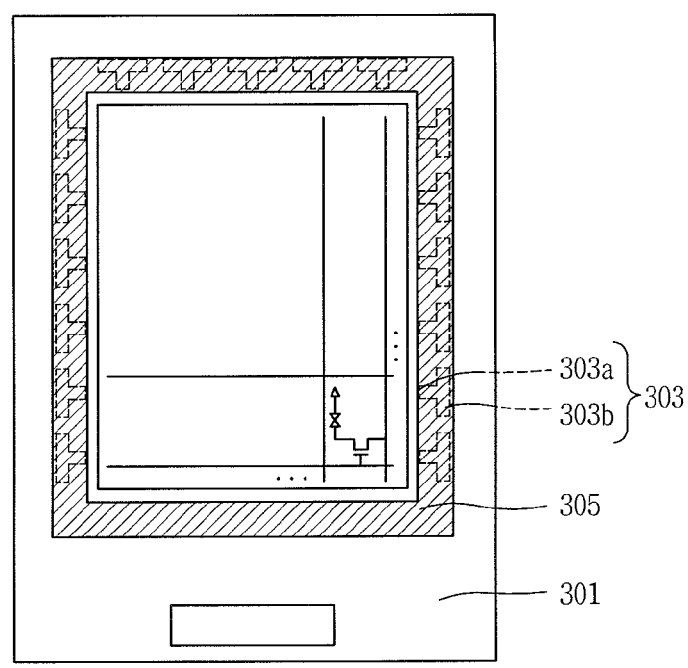
Figure 6B:
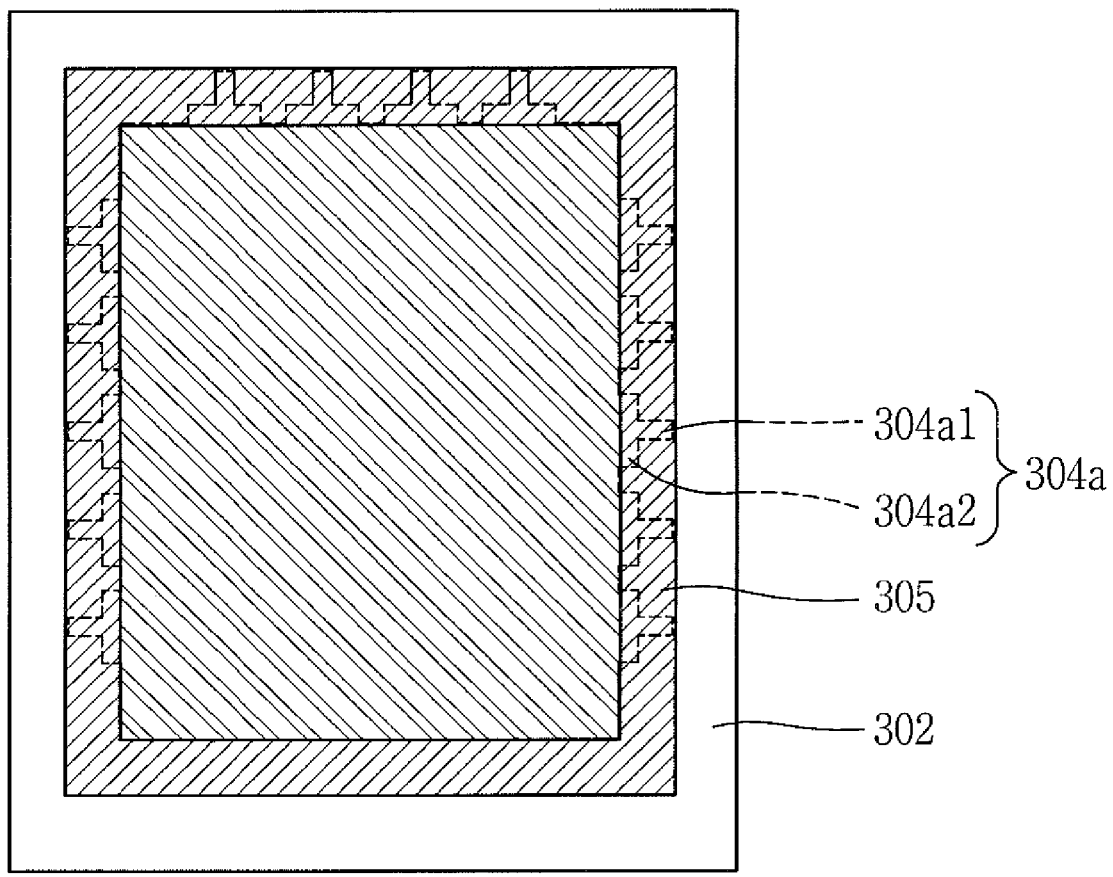

FIGS. 5a to 6b show another example of the first attachment improving protrusions 203 and 303 and second attachment improving protrusions 204a and 304a. Specifically, FIGS. 5a and 6A show the first substrates 201 and 301 with the first attachment improving protrusions 203 and 303 formed thereon, and FIGS. 5b and 6b show the second substrates 201 and 301 with the second attachment improving protrusions 204a and 304a formed thereon.

With reference to FIGS. 5a and 5b, the first attachment improving protrusions 2303 and the second attachment improving protrusions 204a are formed to cross the sealant 205. A plurality of first and second attachment improving protrusions 203 and 204a are formed in the form of a straight line such that they make an angle smaller or larger than 90o with respect to the boundary of the display area (AA) and the non-display area (NA). In this case, the first attachment improving protrusions 203 and the second attachment improving protrusions 204a may be formed to go crisscross, without overlapping with each other.

With reference to FIGS. 6a and 6b, the first attachment improving protrusion 303 may include a first region 303a formed to cross and overlap with the sealant 305 and a second region 303b branched off from the first region 303a and formed to be parallel to the sealant 305. The second attachment improving protrusions 304a may include a third region 304a1 formed to cross and overlap with the sealant 305 and a fourth region 304a2 branched off from the third region 304a1 and formed to be parallel to the sealant 305. In this case, the first region 303a of the first attachment improving protrusion 303 and the third region 304a1 of the second attachment improving protrusion 304a are formed to go crisscross without overlapping with each other, and the second region 303b of the first attachment improving protrusion 303 and the fourth region 304a2 of the second attachment improving protrusion 304a are also formed to go crisscross without overlapping with each other.

Here, although not shown in detail, a common voltage supply terminal (not shown) made of the same material as the gate electrode (107a in FIG. 4) of the TFT (107 in FIG. 4) is formed on the layer on which the gate electrode 107a is formed on the first substrate 301. The common voltage supply terminal is connected with the first attachment improving protrusions 303 via contact holes (not shown) formed at the gate insulating layer (107 in FIG. 4) and the passivation layer (108 in FIG. 4). Because the second region 303b is provided at the first attachment improving protrusion 303 as shown in FIG. 6a, a sufficient area for forming the contact holes can be secured.

As described above, in the LCD according to the exemplary embodiment of the present invention, the plurality of first attachment improving protrusions 103 are formed on the non-display area (NA) of the first substrate 101, the plurality of second attachment improving protrusions 104a are formed on the non-display area (NA) of the second substrate 102, and the sealant 105 is formed to cover the external faces of the first and second attachment improving protrusions 103 and 104a. Thus, the attachment area of the sealant 105 is increased to advantageously strengthen the adhesive strength of the sealant 105.

Accordingly, although an external force (e.g., a force pulling the first or second substrate) is applied to the first or second substrate 101 or 102, a problem that the attached state of the sealant 105 is released from the first or second substrate 101 or 102 at the entirety or a portion of the sealant 105 does not arise.

In describing the LCD according to the exemplary embodiment of the present invention, the case where the pixel electrode 109 is formed on the first substrate 101, the common electrode 104 is formed on the second substrate 102 and the liquid crystal layer is driven by a vertical field of the pixel electrode 109 and the common electrode 104 is taken as an example, but the present invention is not limited thereto and various modifications may be possible without departing from the spirit or scope of the present invention. For example, the pixel electrode 109 and the common electrode 104 may be formed on the first substrate 101 and the liquid crystal layer is driven by a horizontal (in-plane) field.

Namely, although not shown in detail, an LCD according to an embodiment of the present invention may include: first and second' substrates (not shown) on which a display area (not shown) and a non-display area (not shown) are defined and a plurality of pixels are defined at the display area; a plurality of attachment improving protrusions (not shown) formed at the non-display area along the outer edges of the display area on the first substrate; a common electrode (not shown) formed at each pixel and connected with at least one of the attachment improving protrusions to receive a common voltage therefrom; and a sealant (not shown) formed between the first and second substrates so as to be attached with the attachment improving protrusions and having conductivity. In this case, the attachment improving protrusions may be formed to cross the sealant, and a plurality of the attachment improving protrusions may be formed to be parallel (side by side) in the form of a straight line. Alternatively, each of the attachment improving protrusions may include a first region (not shown) formed to cross and overlap with the sealant and a second region (not shown) formed to be parallel to the sealant.

Also in the configuration that the pixel electrode and the common electrode are all formed on the first substrate and the attachment improving protrusions are formed on the first substrate, the sealant is formed to cover the external faces of the attachment improving protrusions to increase the attachment area of the sealant and thus strengthen the adhesive strength of the sealant. Thus, although an external force (e.g., a force pulling the first or second substrate) is applied to the first or second substrate 101 or 102, a problem that the attached state of the sealant 105 is released from the first or second substrate 101 or 102 at the entirety or a portion of the sealant 105 does not arise.

As the present invention may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A liquid crystal display device comprising:
   first and second substrates on which a display area and a non-display area are defined and a plurality of pixels are defined at the display area;
   a pixel electrode formed at each pixel on the first substrate;
   a plurality of first attachment improving protrusions formed at the non-display area along edges of the display area on the first substrate and made of the same material as the pixel electrode on the layer on which the pixel electrode is formed;
   a common electrode formed at least on a display area of the second substrate;
   a plurality of second attachment improving protrusions formed on the non-display area of the second substrate and branched off from the common electrode; and
   a sealant formed between the first and second substrates such that the sealant is attached with the first and second attachment improving protrusions, and having conductivity,
   wherein the common electrode receives a common voltage via the sealant and the first attachment improving protrusions,
   wherein the first attachment improving protrusions are formed to cross the sealant, and the plurality of first attachment improving protrusions are formed to be parallel in the form of a straight line.

2. The device of claim 1, wherein the first and second attachment improving protrusions are formed to cross the sealant, and the plurality of first and second attachment improving protrusions are formed to be parallel in the form of a straight line.

3. The device of claim 1, wherein the first and second attachment improving protrusions are formed to go crisscross.

4. The device of claim 1, wherein each of the first attachment improving protrusions comprises a first region formed to cross and overlap with the sealant and a second region formed to be parallel side by side with the sealant, and each of the second attachment improving protrusions comprises a third region formed to cross and overlap with the sealant and a fourth region formed to be parallel side by side with the sealant.

5. The device of claim 4, wherein the first and third regions are formed to go crisscross, and the second and fourth regions are formed to go crisscross.

* * * * *